(12) United States Patent
Wells et al.

(10) Patent No.: US 11,448,238 B2
(45) Date of Patent: Sep. 20, 2022

(54) PNEUMATIC LANDFILL PUMP CYCLE COUNTER

(71) Applicant: Q.E.D. Environmental Systems, Inc., Dexter, MI (US)

(72) Inventors: Steven R. Wells, Howell, MI (US); William C. Allen, III, Dexter, MI (US); Matthew T. McKeown, Fowlerville, MI (US); Mark T. Weinberger, Mounds View, MN (US); John F. Schaupp, Sylvania, OH (US); David A. Fischer, Ann Arbor, MI (US); Leonard Felton Stevens-Moman, Dexter, MI (US)

(73) Assignee: Graco Minnesota Inc., Minneapolis, MN (US)

( * ) Notice: Subject to any disclaimer, the term of this patent is extended or adjusted under 35 U.S.C. 154(b) by 22 days.

(21) Appl. No.: 16/869,756

(22) Filed: May 8, 2020

(65) Prior Publication Data
US 2020/0263706 A1 Aug. 20, 2020

Related U.S. Application Data

(63) Continuation-in-part of application No. 16/756,893, filed as application No. PCT/US2018/058389 on Oct. 31, 2018, now abandoned.

(60) Provisional application No. 62/579,574, filed on Oct. 31, 2017, provisional application No. 62/983,698, filed on Mar. 1, 2020.

(51) Int. Cl.
F04F 1/06 (2006.01)
G01D 5/14 (2006.01)

(52) U.S. Cl.
CPC ............... *F04F 1/06* (2013.01); *G01D 5/14* (2013.01)

(58) Field of Classification Search
CPC .................................... G01D 5/14; F04F 1/06
See application file for complete search history.

(56) References Cited

U.S. PATENT DOCUMENTS 5,419,191 A * 5/1995 Niehaus ............... G01F 1/72
235/94 R \* cited by examiner

*Primary Examiner* — Clayton E. La Balle
*Assistant Examiner* — Michael A Harrison

(57) ABSTRACT

Various embodiments concern a pneumatic landfill pump cycle counter comprising a spring located within a housing passage and a shuttle comprising a shuttle magnet, the shuttle located within the passage. The shuttle can be configured to move axially by the spring within the passage in an upstream direction to a home position, move axially by one or both of air pressure differential and airflow within the passage in a downstream direction away from the home position to a hold position. The cycle counter can further comprise a counter comprising an element responsive to a magnetic field of the shuttle magnet, the counter configured to increment a numeric count for each complete cycle of the shuttle moving from the home position to the hold position and then back to the home position.

19 Claims, 9 Drawing Sheets

PNEUMATIC LANDFILL PUMP CYCLE COUNTER

CROSS-REFERENCE TO RELATED APPLICATIONS

This application is a continuation-in-part, and claims the benefit of priority, of U.S. patent application Ser. No. 16/756,893, titled FLUID PUMP FOR GROUNDWATER WELLS WITH CYCLE COUNTER, filed Apr. 17, 2020, which is a US National Stage Patent Application that claims the benefit of priority of International Patent Application PCT/US2018/058389, filed Oct. 31, 2018, which claims the benefit of priority of U.S. Provisional Application No. 62/579,574, filed Oct. 31, 2017; this application also claims the benefit of priority of U.S. Provisional Application No. 62/983,698, filed Mar. 1, 2020, titled "PNEUMATIC LANDFILL PUMP CYCLE COUNTER"; the entire contents of each of the referenced applications is incorporated by reference herein in its entirety.

BACKGROUND

This section provides background information related to the present disclosure which is not necessarily prior art.

With fluid pumps such as groundwater sampling pumps, a cycle counter has often been included as a subsystem of the pump for counting the number of cycles that the pump cycles on and off. Typically these pulse counter subsystems have involved the use of a non-mechanical counter, or in some instances the use of a reed switch, which works together with a linearly movable component, often referred to as a "shuttle".

One drawback of the above described construction is that the shuttle is allowed to travel a relatively long distance as it moves from its home position to its equilibrium position. In some instances, this results in the reed switch changing state or "count" multiple times when only a single state change (i.e., detection of a single pump On/Off cycle) should have occurred. The multiple state changes are caused by multiple magnetic flux fields which are presented to the reed switch as the shuttle is moved from the home position to its end-of-stroke position. Another disadvantage with present day devices is the need to adjust/calibrate the counter for each well and/or well condition.

SUMMARY

This section provides a general summary of the disclosure, and is not a comprehensive disclosure of its full scope or all of its features.

Various embodiments concern a pneumatic landfill pump cycle counter comprising a spring located within a housing passage and a shuttle comprising a shuttle magnet, the shuttle located within the passage. The shuttle can be configured to move axially by the spring within the passage in an upstream direction to a home position, move axially by one or both of air pressure differential and airflow within the passage in a downstream direction away from the home position to a hold position. The cycle counter can further comprise a counter comprising an element responsive to a magnetic field of the shuttle magnet, the counter configured to increment a numeric count for each complete cycle of the shuttle moving from the home position to the hold position and then back to the home position.

The cycle counter can include one or more magnets that are moved in response to movement of the shuttle.

A brace can stop the movement of the shuttle in a hold position to prevent over-counting.

The shuttle can include a snub-nose profile.

Further areas of applicability will become apparent from the description provided herein. The description and specific examples in this summary are intended for purposes of illustration only and are not intended to limit the scope of the present disclosure.

DETAILED DESCRIPTION

The present disclosure concerns a landfill pump system. More particularly, the present disclosure concerns a pneumatic landfill pump cycle counter for counting the number of cycles of a submerged landfill pump. The number of cycles of the submerged landfill pump can relate important information, such as the total quantity of liquid removed from a well as well as the rate of removal, and can confirm that the submerged landfill pump is operating. Accurate counting of cycles is important for accurate pumping information. Aspects of the present disclosure concerns features to support accurate counting of pump cycles.

While the example of pumping water from a landfill well will be used herein, it will be understood that the water could be any type of liquid which accumulates in a landfill well. Indeed, the water may include leachate or other contaminants.

Figure 1:
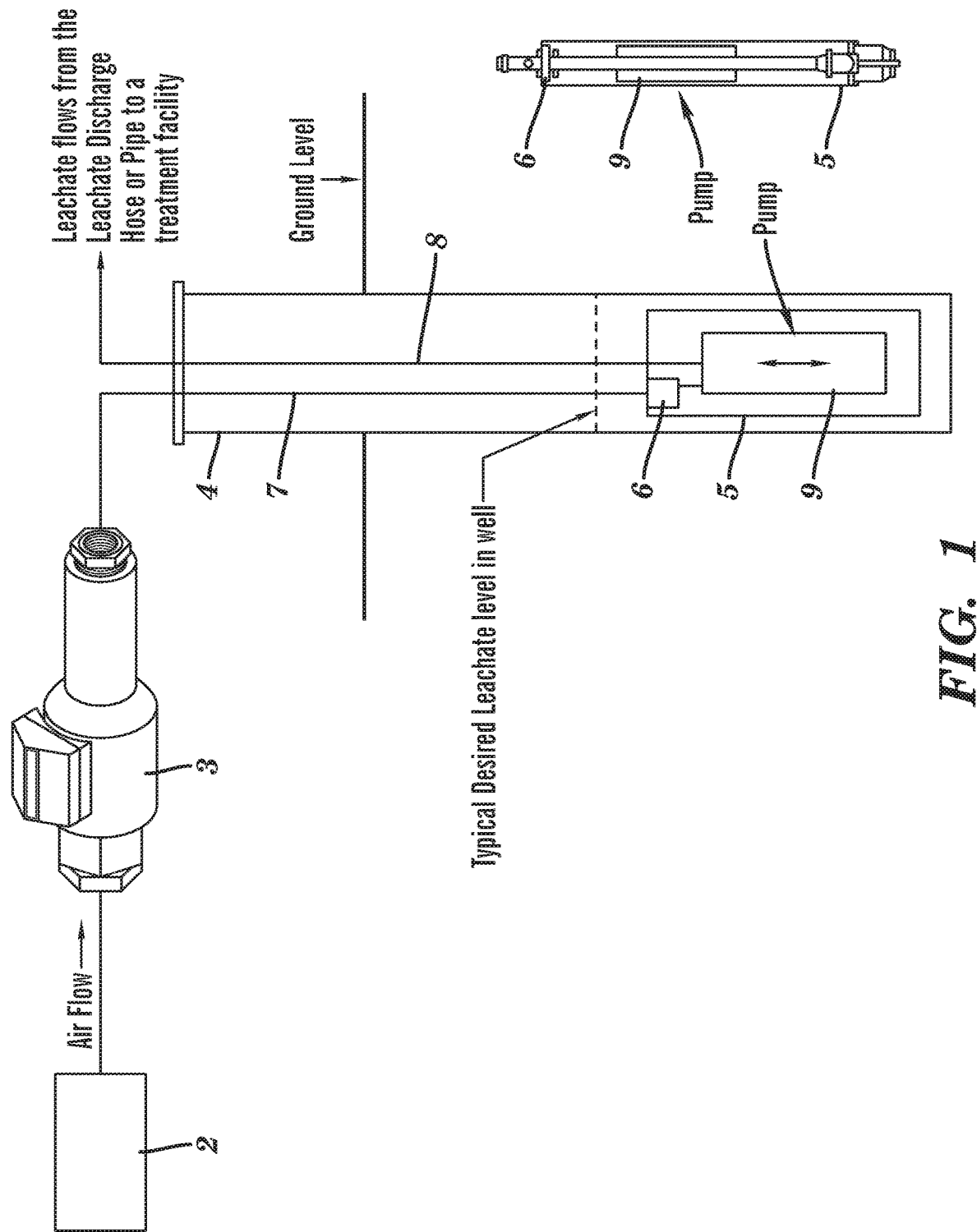
FIG. 1 is a schematic of a landfill pumping system having a pneumatic landfill pump cycle counter.

FIG. 1 illustrates a landfill pump system 1. The landfill pump system 1 includes a source of compressed gas 2. The source of compressed gas 2 can be a tank and/or a compressor. The compressed gas can be compressed air or any other type of gas. The compressed gas is output to flow through a pneumatic landfill pump cycle counter 3. The pneumatic landfill pump cycle counter 3 will further be discussed herein. The compressed gas further flows past the pneumatic landfill pump cycle counter 3 into a landfill well 4. The landfill well 4 is a bore into the ground, typically with casement. The compressed gas is supplied to a submersible landfill pump 5. A pneumatic supply line 7 can route the compressed gas from the source of compressed gas 2 to the pneumatic landfill pump cycle counter 3 and to the submersible landfill pump 5. The pneumatic supply line 7 can be comprised of one or more hoses, including fittings to attach to various components. The compressed gas is received by a valve 6 within the submersible landfill pump 5.

The submersible landfill pump 5 operates by water in the landfill filling an interior pump chamber of the submersible landfill pump 5 during a dwell phase of the submersible landfill pump 5. The increasing water level within the submersible landfill pump 5 moves a float 9 located within the submersible landfill pump 5. After the float 9 has moved a threshold distance, the valve 6 is actuated open. The float 9 can be mechanically linked to the valve 6 to actuate the valve 6, or one or more electrical components, such as one or both of a sensor and electric actuator, can actuate the valve 6 based on the position of the float 9. Once the valve 6 is open, which corresponds to a pump phase, the compressed air rushes in to the internal chamber of the submersible landfill pump 5 to force the water out from the submersible landfill pump 5 through the evacuation line 8. The expelled water is typically routed above ground to a treatment facility and/or reservoir, and in some cases to an analyzer for testing. Evacuation line 8 can be one or more hoses. After discharging the water, the float 9 moves downward due to the lower or absent water volume within the submersible landfill pump 5, actuating the valve 6 to close. Actuating the valve 6 to close prevents compressed air from bypassing the valve 6, returning the submersible landfill pump 5 to the dwell phase and completing the pump cycle. The submersible landfill pump 5 will once again fill with water during the dwell phase and the cycle will be repeated.

Being that the submersible landfill pump 5 is pneumatically powered, and the compressed gas flows only during the pump phase, not the dwell phase, of the pump cycle, the flow of compressed gas can be used as indicia of the pump cycle. For example, the compressed gas flows through the pneumatic supply line 7 during the pump phase when the valve 6 is accepting compressed gas but the compressed gas does not flow through the pneumatic supply line 7 during the dwell phase when the valve 6 is not accepting compressed gas, thus creating a deadhead condition in the pneumatic supply line 7 and preventing flow once the pressure within the pneumatic supply line 7 equalizes.

Being that the compressed gas flows through the pneumatic landfill pump cycle counter 3, the pneumatic landfill pump cycle counter 3 can detect the phases of gas flow and gas stagnation to register each pump cycle. More specifically, the pneumatic landfill pump cycle counter 3 can detect a phase of compressed gas flowing and then detect a phase of the compressed gas not flowing to register one pump cycle. The pneumatic landfill pump cycle counter 3 can increment a running (cumulative) count of pump cycles each time both a pumping phase and a dwell phase are detected based on the flow, and lack of flow, of compressed gas. However, inaccurate detection of the phases, such as double counting a phase or missing the count of a phase, can result in errors in counting the pump cycles. Such errors can lead to erroneous data for total volume and flow rate of water pumped from the well 4. Aspects of the present disclosure concern accurate counting of pump cycles, as further discussed herein.

In various embodiments, the pneumatic landfill pump cycle counter 3 does not regulate the flow of pressurized gas. Rather, the pneumatic landfill pump cycle counter 3 passively responds to the flow of gas to count pump cycles. The pneumatic landfill pump cycle counter 3 does not control the operation of the submersible landfill pump 5 nor the source of pressurized gas 2, however other options are possible.

FIGS. 2-6 are cross-sectional views of an embodiment of a pneumatic landfill pump cycle counter 3. In particular, the views show the progression of the pneumatic landfill pump cycle counter 3 counting cycles of the submersible landfill pump 5, starting at the dwell phase, transitioning to the pump phase, and returning to the dwell phase.

Figure 2:
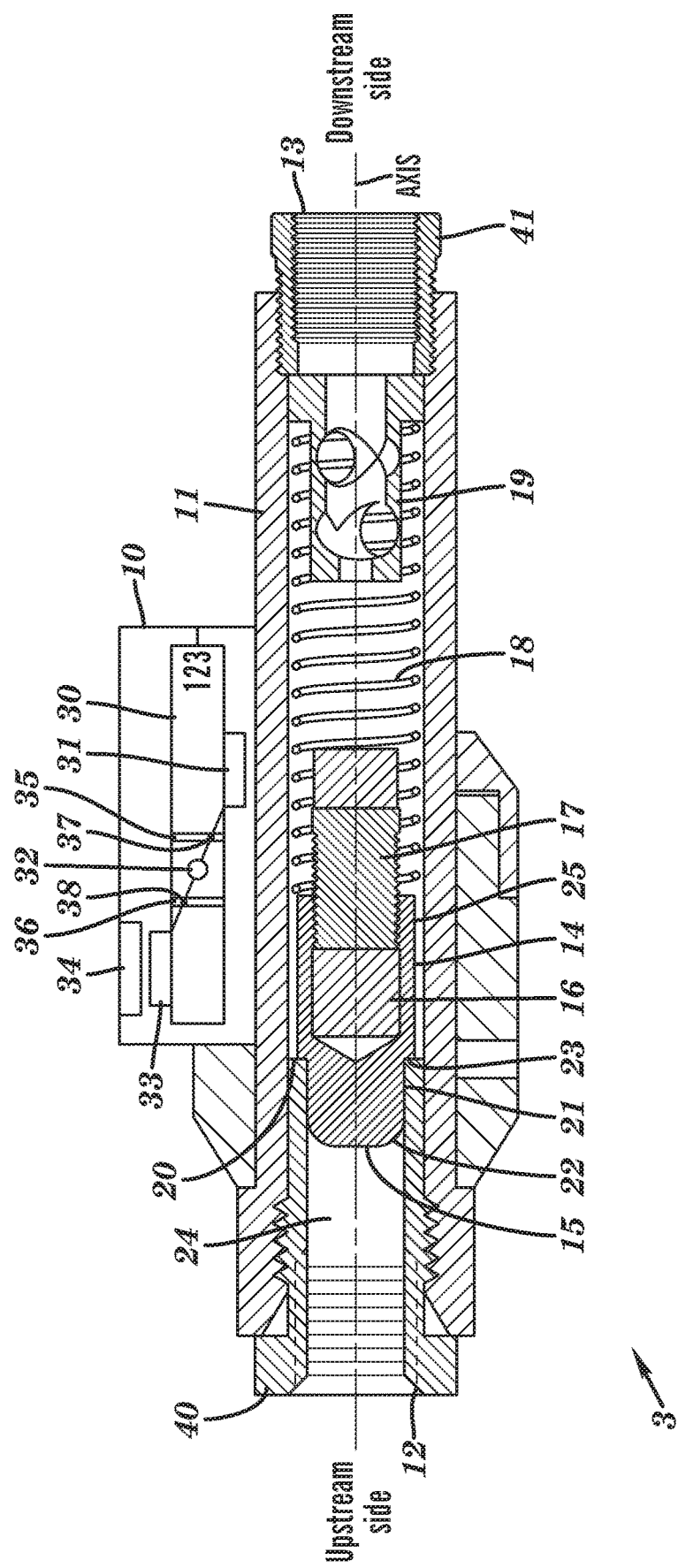
FIG. 2 is a cross sectional view of a pneumatic landfill pump cycle counter in a nominal state.

Turning to the cross-sectional view of FIG. 2, the pneumatic landfill pump cycle counter 3 includes a housing body 11. The housing body 11 can comprise one or more tubes, although other shapes are possible. The housing body 11 can be formed from metal and/or polymer parts amongst other options. The housing body 11 can include an inlet fitting 40 and an outlet fitting 41. The inlet fitting 40 and the outlet fitting 41 can connect with hoses such as those of the pneumatic supply line 7. The housing body 11 includes passage 24. The passage 24 extends from an inlet 12 to an outlet 13, and routes the flow of compressed gas through the housing body 11. In this embodiment, the inlet 12 is formed in the inlet fitting 40 and the outlet 13 is formed in the outlet fitting 41, however various embodiments may have other options. The passage 24 extends straight. The passage 24 is coaxial with the indicated axis.

Compressed air enters the pneumatic landfill pump cycle counter 3 through the inlet 12, flows through the passage 24, and exits the pneumatic landfill pump cycle counter 3 via the outlet 13. Upstream and downstream sides are indicated, representing the direction of flow. With respect to the pneumatic landfill pump cycle counter 3, the inlet 12 may be the only inlet for compressed air, the outlet 13 may be the only outlet for compressed air, and the passage 24 may be the only route for the compressed air between the inlet 12 in the outlet 13.

A shuttle 14 is located within the passage 24. The shuttle 14 moves axially within the passage 24. An axis is indicated, showing the axis along which the shuttle 14 travels. The shuttle 14 of the illustrated embodiment includes a shuttle guide 25. The shuttle guide 25 forms a front part of the shuttle 14. The shuttle guide 25 is on an upstream side of the shuttle 14. The shuttle guide 25 defines an internal cavity. A shuttle magnet 16 is located within the internal cavity. The shuttle magnet 16 is captured in the shuttle guide 25 by plug 17. Plug 17 can thread into the downstream side of the shuttle 14 to secure the shuttle magnet 16 within the shuttle 14.

The shuttle guide 25 includes a nose 15. The nose 15 is located on the upstream most side of the shuttle 14. The nose 15 is circular and has a smaller diameter than the downstream portion of the shuttle 14 including the shuttle guide 25. The nose 15 is smaller to fit within, and past, a seat 20. The seat 20 can be part of the housing body 11 or is otherwise fixed with respect to the housing body 11. The seat 20 is annular to receive the circular nose 15. The nose 15 includes a radiused portion 22. Radiused portion 22 is rounded to facilitate the nose 15 sliding into and past the seat 20 without getting stuck.

The shuttle guide 25 includes a shoulder 23. The nose 15 can be 0.30-0.50 inches in length, measured from the shoulder 23 to its upstream-most tip, however other lengths are possible. The shoulder 23 can be a ridge formed in the shuttle guide 25 to expand the diameter of the shuttle guide 25 in the downstream direction. The shoulder 23 can be annular similar to the nose 15, however as shown in later FIGS., is not entirely circular in this embodiment. The shoulder 23 can be formed by the downstream side of a sleeve of the housing body 11. The shoulder 23 is wider than the seat 20. The interfacing of the shoulder 23 with the seat 20 prevents the shuttle 14 from moving anymore in the upstream direction. Due to this stop, the shuttle 14 remains stationary so long as the shoulder 23 engages the seat 20. This position of the shuttle 14 is referred to herein as the home position, and is the position of the shuttle 14 shown in FIG. 2. The shuttle 14 being in the home position corresponds with insubstantial or no flow of pressurized gas through the pneumatic landfill pump cycle counter 3 or more specifically the passage 24, which corresponds with the previously mentioned dwell phase.

The nose 15 further includes a cylindrical portion 21. The outer diameter of the cylindrical portion is slightly smaller than the inner diameter of the seat 20 (e.g., 0.003 inches smaller) to permit relative movement between the nose 15 and the seat 20 yet have a substantial seal between the cylindrical portion 21 and the seat 20 to resist pressurized gas from passing the interface between the cylindrical portion 21 and the seat 20 when the cylindrical portion 21 is radially overlapping with the seat 20 (e.g., when the shuttle 14 is in the home position). The term radially as used herein refers to the orthogonal directions with respect to the axis extending through the passage 24. Greater pressure differential on the upstream side of the shuttle 14 within the passage 24 relative to the downstream side of the shuttle 14 pushes the nose 15 axially in the downstream direction to move the shuttle 14 in the downstream direction to unseat the shoulder 23 from the seat 20.

Within the housing body 11 is a spring 18. An upstream side of the spring 18 engages the shuttle 14. More specifically, the upstream side of the spring 14 engages the downstream side of the shuttle guide 25. Spring 18 urges the shuttle 14 in the downstream direction and holds the shuttle 14 in the home position. The downstream side of the spring 18 engages brace 19.

Figure 5:
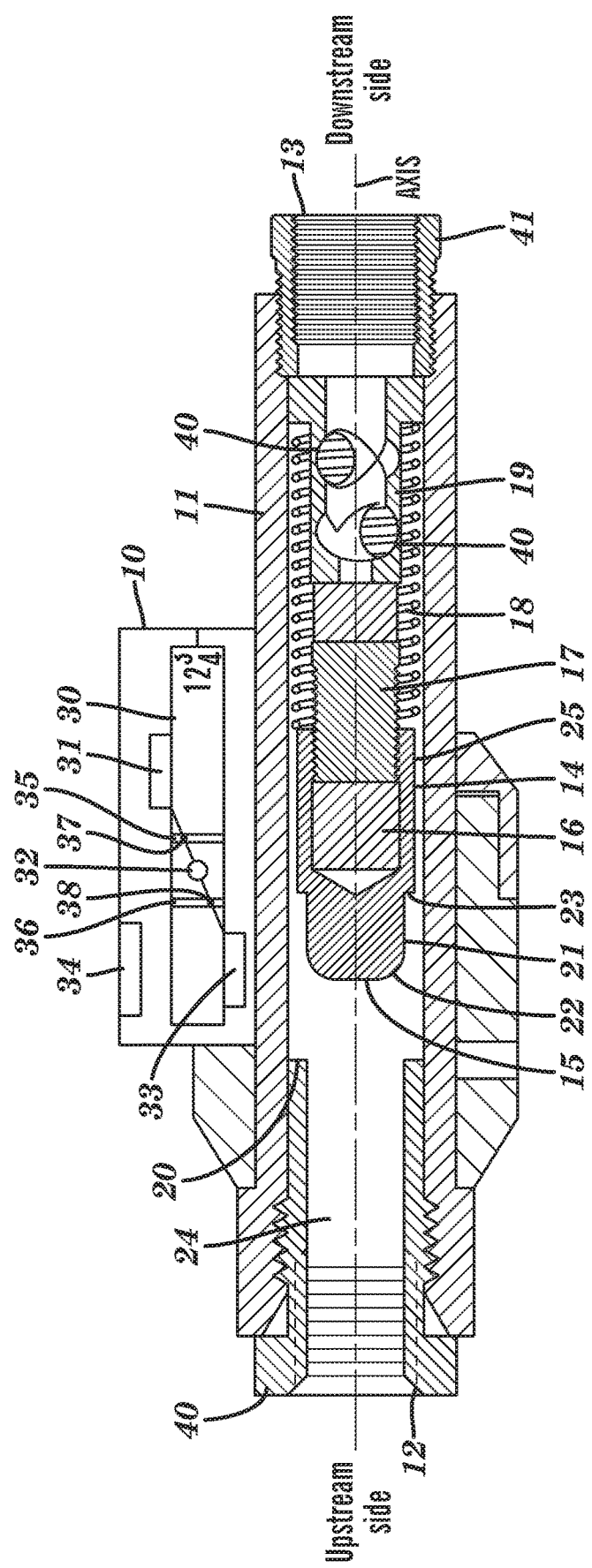
FIG. 5 is another cross sectional view of the pneumatic landfill pump cycle counter with the shuttle in a hold position.

Brace 19 is located within the passage 24. Brace 19 can be coaxial with the axis. Brace 19 can be attached to the outlet fitting 41. Brace 19 can be pushed into the passage 24, and held in place, by engagement with the outlet fitting 41. Brace 19 can hold the downstream side of the spring 18. Brace 19 engages with the downstream side of the shuttle 14 when the shuttle moves in the downstream direction. In this way, the brace 19 limits the travel of the shuttle 14 in the downstream direction to hold the shuttle 14 in a hold position (the hold position of the shuttle 14 is shown in FIG. 5, further discussed herein). The shuttle 14 is maintained in the hold position during flow of compressed gas through the pneumatic landfill pump cycle counter 3. The axial position of the brace 19 can be changed by adjusting a threading interface. More specifically, the outlet fitting 41 threadedly interfaces with inner threading of the housing body 11. Greater or lesser threading interface (by relative rotation) moves the outlet fitting along the axis which correspondingly moves the brace 19 along the axis which correspondingly changes the hold position for when the shuttle 14 engages the brace 19.

Attached to the housing body 11 is a counter 10. The counter includes a counting mechanism that can increment one integer for each cycle of the submersible landfill pump 5 corresponding with a cycle of the shuttle 14 moving from the home position to the hold position (corresponding with the pump phase) and back to the home position (transitioning back to the dwell phase). While an entirely mechanical counter is shown, a partially or fully electrical counter (using one or more reed switches and/or one or more Hall effect sensors) can be used instead.

The counter 10 that is illustrated is a mechanical counter that uses magnetic force from the shuttle magnet 16 to increment counts, represented numerically on a mechanical dial readout. While a particular type of mechanical counter is shown, other types of counting mechanisms can instead be used. The counter 10 of the illustrated embodiment is not electrically powered. In various alternative embodiments, the counter 10 can be electronic wherein the shifting of the magnetic field of the shuttle magnet 16 is sensed by a Hall effect or other type of sensor, corresponding to whether the shuttle magnet 16 is in the home position or the hold position, but in such case a full cycle increment is still counted by the shuttle 14 moving from the home position to the hold position and then back to the home position.

The counter 10 includes a wheel assembly 30. The wheel assembly 30 is a display for indicating the number of cycles. While a physical wheel assembly 30 is shown herein, an electronic screen could instead be used or counting data could be transmitted from the counter 10 via a wired or wireless connection. The wheel assembly 30 includes a plurality of wheels with numbers 0-9. The wheels are shown respectively displaying the numbers 1, 2, and 3. The wheels can move semi-independently, so for example the wheel showing a 3 can be moved one turn to show a 4 corresponding to an increment of one count. A greater number of wheels can be used to count to higher numbers.

The counter 10 includes a counter magnet 31. The counter magnet 31 magnetically interacts with the shuttle magnet 16 when the shuttle magnet 16 is in the hold position. The movement of the shuttle magnet 16 to the hold position causes the counter magnet 31 to move. In this configuration, the counter magnet 31 is repelled by the shuttle magnet 16 when the shuttle magnet 16 is in the hold position. But when the shuttle magnet 16 is in the home position, the magnetic field of the shuttle magnet 16 is not strong enough to push away the counter magnet 31. When the shuttle 14 is in the hold position, the shuttle magnet 16 forces the counter magnet 31 radially away from the axis. The counter magnet 31 can move radially away from the axis due to being attached to lever 32. Lever 32 includes a beam which rotates about a center fulcrum, in the manner of a seesaw. Counter magnet 31 is attached to one end of the beam of the lever 32. The secondary magnet 33 is attached to the other end of the beam. The secondary magnet 33 is attracted to metal mass 34. Metal mass 34 can be ferromagnetic material. Being that the secondary magnet 33 is attracted to the metal mass 34, an upward force is applied to the secondary magnet 33 which moves the secondary magnet 33 radially away from the axis which correspondingly pushes the counter magnet 31 towards the axis due to the lever 21. The counter magnet 31 is shown in its primary (e.g., nominal or resting) position in FIGS. 2-4, which is the position of the counter magnet 31 when there is no or insubstantial magnetic influence on the counter magnet 31 from the shuttle magnet 16. The force between the secondary magnet 33 and the metal mass 34 maintains the counter magnet 31 in this primary position, until the shuttle magnet 16 moves closer to the counter magnet 31 such that the magnetic interaction between shuttle magnet 16 and the counter magnet 31 overcomes the force between the secondary magnet 33 and the metal mass 34 to make the lever 32 rotate. In which case, the counter magnet 31 moves to a secondary position, as shown in FIG. 5. While secondary magnet 33 is used to maintain the counter 10 in the primary position, a spring acting either directly on the counter magnet 31 or a part of the lever 32 (the opposite end of the lever 32) may instead be used to maintain the force to nominally keep the counter magnet 31 in its primary position.

Figure 6:
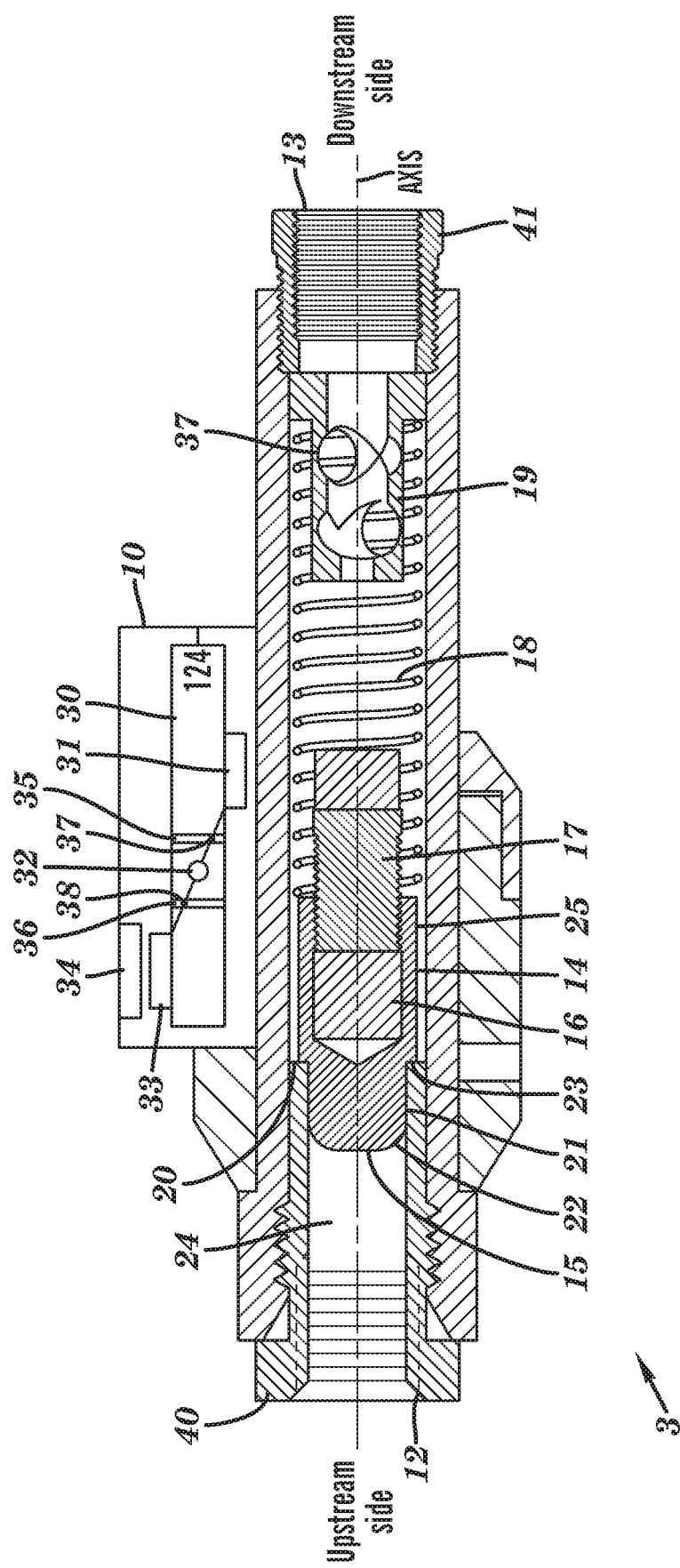
FIG. 6 is another cross sectional view of the pneumatic landfill pump cycle counter with the shuttle having returned to the home position.

A first projection 37 engages a first track 35 of the wheel assembly 30. Likewise, a second projection 38 engages a second track of the wheel assembly 30. The projections 37, 38 can be attached to the lever 32. The projections 37, 38 can be ramped in shape such that when they move radially away from the axis (upwards in this view) they rotate part of the wheel assembly 30, but do not rotate part of the wheel assembly 30 with a radially towards the axis (downwards in this view for example, the projections). In this way, the projections 37, 38 can detent in the tracks 35, 36 to rotate part of the wheel assembly 30 in a first direction but the projections 37, 38 can slide in the track 35, 36 to not rotate the part of the wheel assembly 31 moving in the second direction, instead sliding in the track. In this particular embodiment, when the first projection 37 moves with the counter magnet 31 radially away from the axis, a first half count is incremented, corresponding to one half of the cycle of the submersible landfill pump 5. The registering of a half count is shown in FIG. 5, after the shuttle 14 moved from the home position to the hold position. When the second projection 38 moves radially away from the axis, corresponding to when the counter magnet 31 moves radially towards the axis, another half count is incremented, corresponding to second half of the cycle of the submersible landfill pump 5. The registering of a second half count is shown in FIG. 6, after the shuttle 14 moved from the hold position back to the home position.

Figure 3:
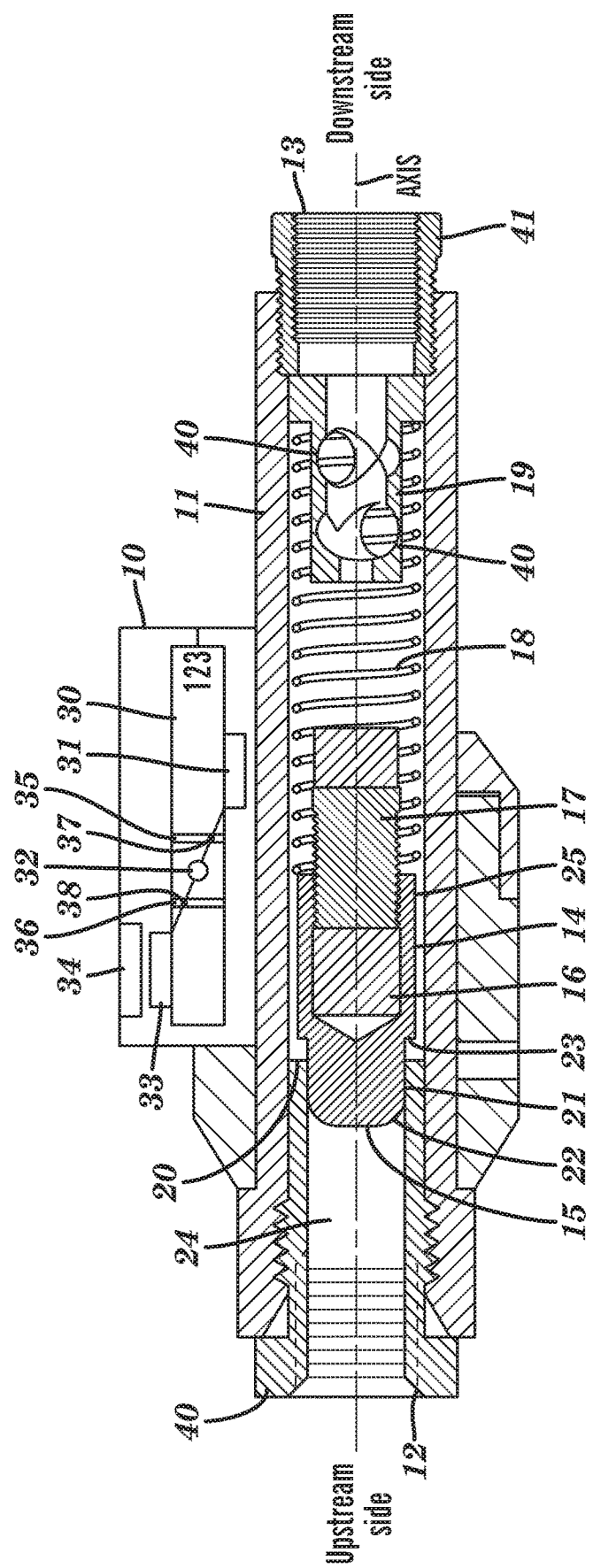
FIG. 3 is another cross sectional view of the pneumatic landfill pump cycle counter with a shuttle in a moving state.

As previously stated, FIG. 2 shows the shuttle 14 in the home position when there is little or no pressure differential on the upstream and downstream sides of the shuttle guide 25. This corresponds with the dwell phase of the submersible landfill pump 5. FIG. 3 shows the condition of the counter 10 after the opening of the valve 6 of the submersible landfill pump 5, creating a pressure differential across the engagement of the cylindrical portion 21 and the seat 20, due to the lowering of the pressure downstream of the shuttle 14 due to opening of the valve 6. In particular, the higher pressure on the upstream side of the shuttle guide 25 pushes the shuttle 14 in the downstream direction, unseating the shoulder 23 from the seat 20. The force acting on the upstream side of the shuttle guide 25 is greater than the force of the spring 20 pushing in the opposite direction, such that the pneumatic force overcomes the spring 18 force. While the shuttle 14 is moving in FIG. 3, a substantial seal is still formed between the cylindrical portion 21 and the seat 22 (even though the shoulder 23 has moved off of the seat 20) to prevent substantial airflow so that the pressure differential is maintained to continue to move the shuttle 14 in the downstream direction.

Figure 4:
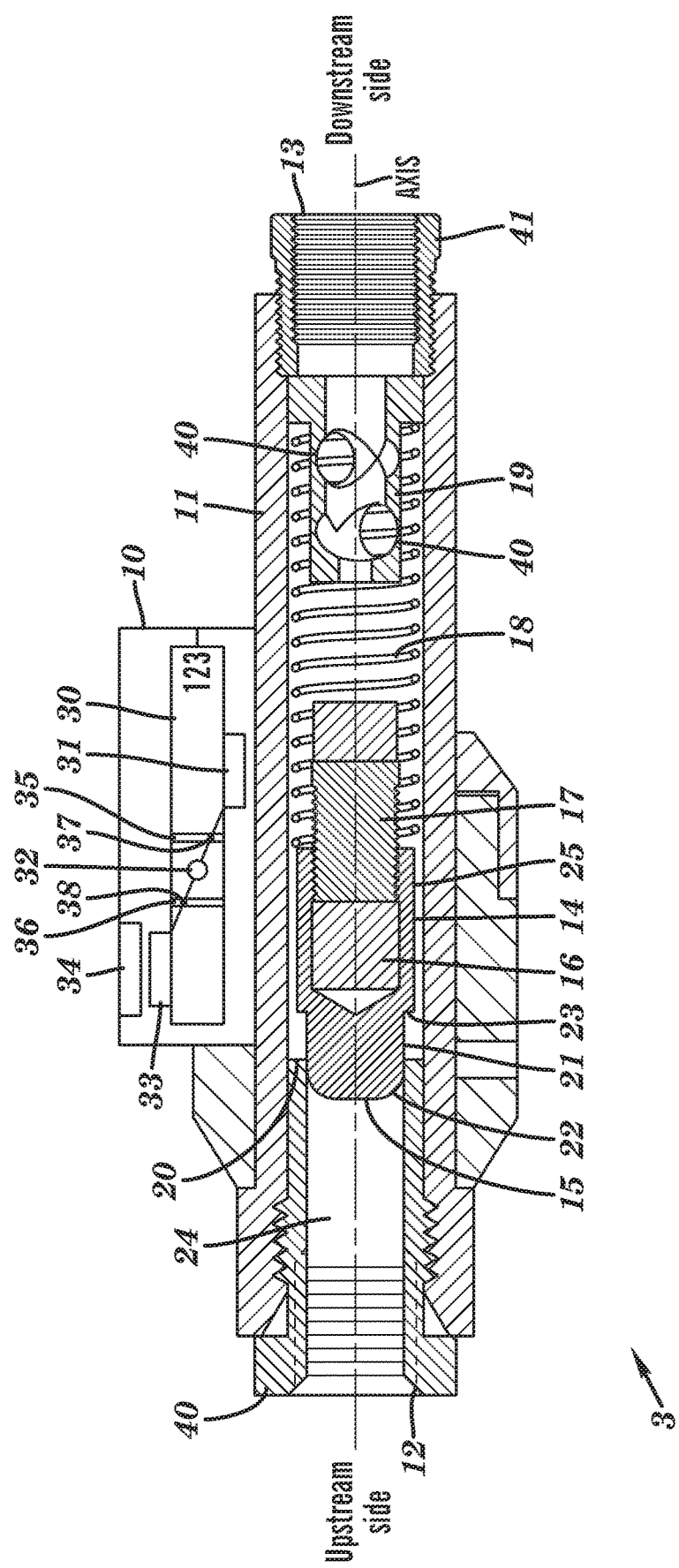
FIG. 4 is another cross sectional view of the pneumatic landfill pump cycle counter with the shuttle further along the moving state.

FIG. 4 shows the shuttle 14 having been moved further in the downstream direction. In the state of FIG. 4, the radiused portion 22 of the nose 15 is just about to move entirely out past the seat 20 which will allow substantial airflow through the passage 24, from the upstream side to the downstream side. The cylindrical portion 21 still interfaces with the seat 20 and provides a substantial seal to allow the shuttle 14 to gain momentum of movement in the downstream direction due to the pressure differential on the upstream side relative to the downstream side of the shuttle guide 25.

In each of the states of FIGS. 3 and 4, the shuttle magnet 16 has not moved far enough in the downstream direction to magnetically interact with the counter magnet 31 sufficient to move the counter magnet 31 radially away from the axis. This is preferable, as minor movements in the range shown in FIG. 3 or 4 may be due to minor pressure fluctuations and alone do not correspond with a pump cycle. In this way, the shuttle 14 can move for some distance away from the home position and back to the home position without moving the counter magnet 31 or even registering any part of a count in the counter 10. This aspect helps eliminate erroneous counts.

FIG. 5 shows the shuttle 14 having moved to the hold position in which the shuttle 14 engages the brace 19. The brace 19 stops further movement of the shuttle 14 in the downstream direction. The brace 19 holds the shuttle in the hold position such that the shuttle magnet 16 interacts with the counter magnet 31. When in the hold position, the shuttle magnet 16 forces the counter magnet 31 to move radially away from the axis to actuate the counter mechanism. In this embodiment, this movement of the counter magnet 31 causes the projection 37 to slide in the first index to increment a half count (halfway between 3 and 4), however other increment amounts such as an entire integer increment can instead be made with the same motion of the magnet 31. The brace 19 holds the shuttle 14 in the hold position, and the shuttle magnet 16 maintains the counter magnet 31 in the secondary position as shown, as long as the flow of compressed air applies force to the nose 15 that overcomes the reaction force of the spring 18. While in the hold position, shuttle magnet 16 continues to magnetically interact with the counter magnet 31 such that the counter magnet 31 maintains its secondary position even though the increment for the actuation to this secondary position/hold position for this actuation has already been registered.

While the shuttle 14 is in the hold position, the compressed air can move through one or more ports 40 in the brace 19. The ports 40 are radially orientated with respect to the axis to allow air flow from the radial side of the brace 19 so that compressed gas can flow into the brace 19, and out the outlet 13, even if the plug 17 is covering the upstream side of the brace 19. The brace 19 includes a central bore in fluid communication with the ports 42 and the outlet 13 to permit compressed gas to flow.

Once the submersible landfill pump 5 completes the pumping phase of the cycle, the valve 6 is closed, causing a deadhead condition and increasing the pressure within the pneumatic supply line 7. Soon, there is no longer a pressure differential across the shuttle guide 25 to overcome the spring 18 such that the spring 18 pushes the shuttle 14 in the upstream direction, from the hold position to the home position. Even before the shuttle 14 reaches the home position, as the shuttle 14 moves from the upstream direction, the repulsion force on the counter magnet 31 from the shuttle magnet 16 becomes less due to the increased separation distance. The attraction force between the secondary magnet 33 and the metal mass 34 overcomes with diminishing repulsion force so that the lever 32 actuates the counter magnet 31 back towards its primary position. Such movement causes the second projection 38 (on the opposite side of the pivot as the first protection 37) to move radially away from the axis to rotate the portion of the wheel assemblies 32 to increment another half count, such that a full count is now completed due to the shuttle 14 having been moved from the home position to the hold position (corresponding with a pumping phase) and then from the hold position back to the home position (corresponding with the transition back to the dwell phase). As such, each of a first movement in which the shuttle 14 moves from the home position to the hold position, and a second movement in which the shuttle 14 moves from the hold position to the home position, registers only a part (in this case half) of a integer increment. In some embodiments however, only one of the motions of the lever 32 increments the counter 10 (e.g., rotates the wheel assembly 30), either when the counter magnet 31 moves radially away from the axis (corresponding to when the shuttle 14 moves from the home position to the hold position) or when the counter magnet 31 moves radially towards the axis (corresponding to when the shuttle 14 moves from the hold position to the home position).

As shown in FIG. 6, the shuttle 14 has returned to the home position and the counter magnet 31 has returned to the primary position. The shuttle 14 can remain in this position, corresponding to the dwell phase, when the submersible landfill pump 5 is refilling with water. The cycle can begin again, and another count registered, when the level the water raises the float 9 high enough to actuate the valve 6 to restart the flow of pressurized gas through the pneumatic landfill pump cycle counter 3.

While the shuttle magnet 16 is described as magnetically interacting with the counter magnet 31 so as to repel and move the counter magnet 31 radially away from the primary position to the secondary position when the shuttle magnet 16 moves near and to the hold position, other options are possible, such as with attracting instead of repelling the counter magnet 31. For example, the primary position of the counter magnet 31 may be radially away from the axis when the shuttle magnet 16 is in the home position, and movement of the shuttle magnet 31 near and to the hold position allows the shuttle magnet 16 to magnetically attract and move the counter magnet 31 radially closer to the axis to the secondary position. Return of the shuttle magnet 16 to the home position releases the attractive force on the counter magnet 31 which is then allowed (by spring or magnetic force) to return to the primary position, incrementing a whole count for the whole movement from the primary position to the secondary position and back to the primary position. In some cases, a lever 32 mechanism is not used and/or a single counter magnet 31 is used.

The brace 19 prevents over-travel and over counting. Over-travel can occur when the shuttle magnet 16 travels beyond the substantial influence range of the counter magnet 31 before the shuttle 14 changes direction towards the home position to once again magnetically interact with, and move, the counter magnet 31. Such over-travel can result in double counting because the counter magnet 31 experiences the coming and going, and therefore rising and falling, of the magnetic influence of the shuttle magnet 16 twice for each cycle, instead of once when the shuttle 14 is held in the hold position. The brace 19 prevents the shuttle 14 from traveling any further in the downstream direction which would otherwise risk the shuttle magnet 16 going too far in the downstream direction to be able to maintain the counter magnet 31 in the secondary position, such that the counter magnet 31 may return to its primary position, incrementing another partial or full count even though cycle of the submersible landfill pump 5 is not complete. In such a scenario without the brace 19, the movement of the shuttle 14 in the downstream direction beyond the hold position releases the magnetic interaction between the shuttle magnet 16 and the counter magnet 31, allowing the lever 32 to register an increment. Then, when the pump cycle completes and the shuttle 14 moves in the upstream direction, and the shuttle magnet 16 would again repel and move the counter magnet 31, registering another partial or full count while the shuttle 14 moves in the home position. Thus, the brace 19 holding the shuttle 14 in the hold position can prevent erroneous double counting.

Brace 19 is tubular, such that the engagement area between the brace 19 and the shuttle 14 is annular. The upstream side of the brace 19 is annular, including a central bore, and thus provides annular engagement with downstream side of shuttle 14 so that the bracing force is coaxial with the axis, instead of, for example an asymmetric projection in the passage 14 that may push the shuttle 14 off center with respect to the axis. Furthermore, the brace 19 is not part of the housing body 11 that forms the passage 24. The brace 19 is located entirely within the passage 24. Removal of the brace 19 by removal of the outlet fitting 41 allows the shuttle 14 and the spring 18 to slide out of the passage 24 of the housing body 11.

Adjusting the axial position of the brace 19, such as by further or less threading of the outlet fitting 41, allows the hold position of the shuttle 14 to be adjusted to ensure that the shuttle magnet 16 properly moves the counter magnet 31 to the secondary position to actuate a counter, and holds the counter magnet 31 in the secondary position as long as the shuttle 14 remains in the hold position, whereas axial misalignment between shuttle magnet 16 and the counter magnet 31 may not allow for full actuation of the counter magnet 31 and level 32. For example, as shown in FIG. 5, when the shuttle 14 is in the hold position, the counter magnet 31 is directly radially outward from the shuttle magnet 16. It is also noted that, in some configurations, when the shuttle 14 is in the hold position, the counter magnet 31 is at least partially downstream of the downstream end of the shuttle magnet 16, which ensures that the strongest part of the magnetic field of the shuttle magnet 16 did not travel in the downstream direction past the counter magnet 31, which risks diminishing the force on the counter magnet 31 and the counter magnet 31 moving towards the primary, nominal position while the shuttle 14 is not begun to move back towards the home position, which risks double counting. In embodiments in which the counter magnet 31 is replaced by a hall effect or reed sensor, the brace 19 still positions the shuttle magnet 16 in the hold position so that the sensor, like the counter magnet 31, is directly radially outward from the shuttle magnet 16 with respect to the axis.

If the counter 10 were to be electric based instead of strictly mechanical, then a first half count can be registered when a sensor detects the shuttle magnet 16 in the hold position, and then the second half count can be registered when the sensor no longer detect the shuttle magnet 16 being in the hold position. Alternatively, a full count can be registered when the sensor detects the shuttle magnet 16 in the hold position (e.g., either when the electromagnetic field of the shuttle magnet 16 is first detected arriving in the hold position or when last detected having left the hold position). In either case, the brace 19 prevents the shuttle magnet 16 from traveling past the sensor in the downstream direction and then traveling back past the sensor in the upstream direction, which would risk as double count.

The snub-nose shape of the nose 15 has particular advantages. The radiused portion 22 is curved with respect to the axis, and concentric about the axis. The radiused portion 22, and the entirely of the nose 15 in various embodiments, does not include a conical (or frustroconical) portion. The nose 15 of the shuttle 14 travels entirely out of the seat 20, such that the entirety of the shuttle 14 is in the downstream direction relative to the seat 20 once the nose 15 leaves the seat 20. In this state, the pressure differential is acting on the entire face of the nose 15, including the shoulder 23, to increase the force on the shuttle 14 to ensure that the shuttle 14 is reliably moved in the downstream direction to engage the brace 19. The snub nose profile of the nose 15 provides increased gain when the nose 15 exits the seat 20.

Therefore, once the cylindrical portion 21 moves past the seat 20, the radiused portion 22 represents rapidly diminished cross-section transiting past the seat 20 as the shuttle 14 moves in the downstream direction, maximizing gas flow and allowing the gas to act on the entire face of the nose 15 including the shoulder 23. A long, tapered nose that extends further into the seat 20 would require longer travel downstream direction before the nose would clear the seat, if it would ever clear seat, resulting in less force acting on the shuttle 14 and thus less reliable travel.

Figure 7:
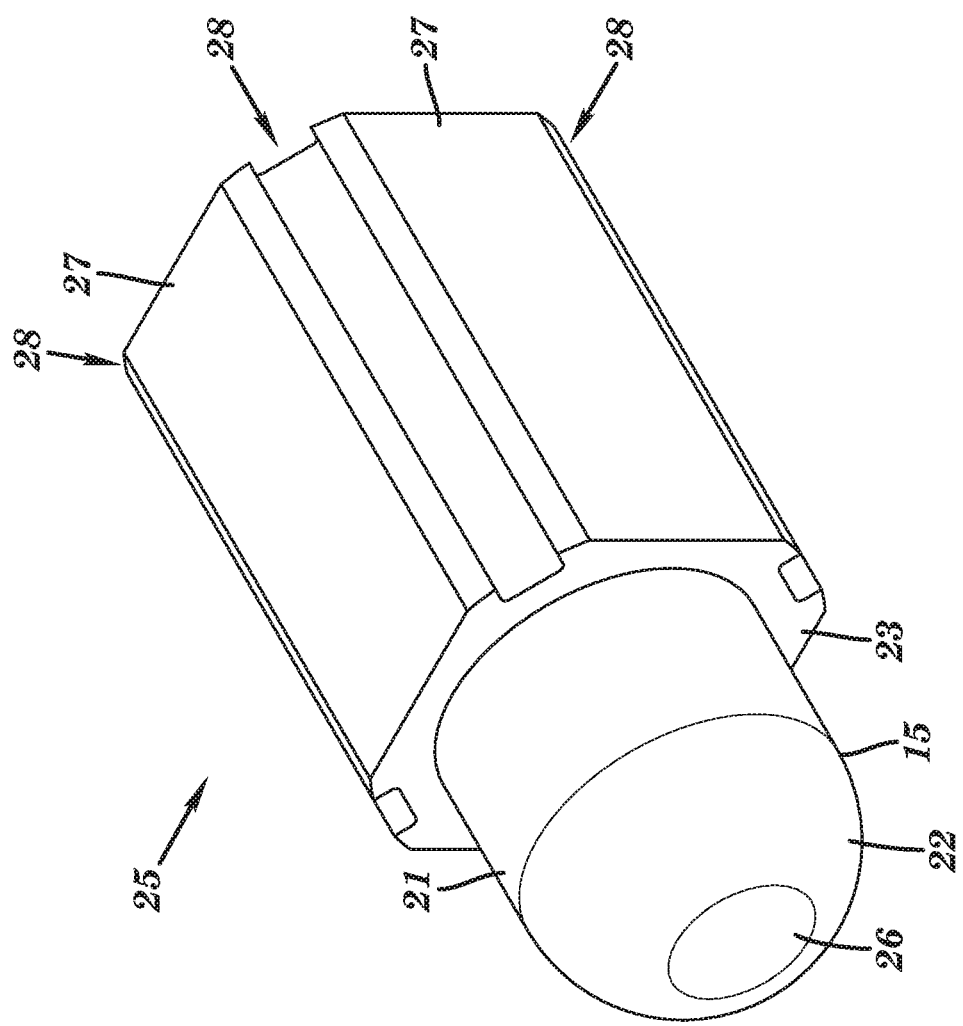
FIG. 7 is a perspective view of a shuttle guide.
Figure 8:
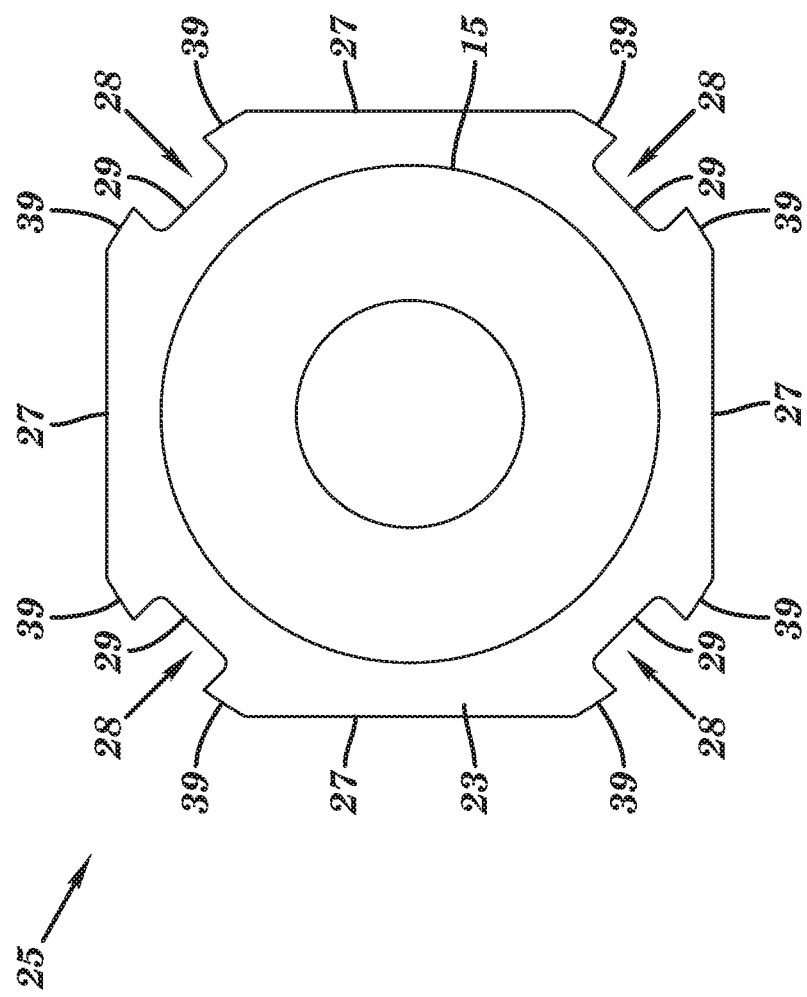
FIG. 8 is a front view of the shuttle guide.

FIG. 7 shows a detailed view of the shuttle guide 25. FIG. 8 is a front view of the shuttle guide 25. As shown, the nose 15 of the shuttle guide 14 includes a flat tip 26. Alternatively, the tip of the nose 15 can be routed or pointed.

The passage 24 has a cylindrical interior. However, except for the nose 15 of the shuttle guide, the outer profile of the shuttle guide 25 is not circular or cylindrical. This allows the cylindrical portion 21 to form a seal with the seat 20, but the rest of the shuttle guide 25 does not seal with the interior of the passage 24 due to not being round. As shown, the shuttle guide 25, on the downstream side relative to the nose 15, is generally squared. For example, the shuttle guide 25 includes flats 27. The flats 27 extend from the shoulder 23 to the downstream end of the shuttle guide 14. There are four flats 27 shown, corresponding to the four square sides. The flats 27 provide separation space between the exterior of the shuttle guide 25 in the interior of the passage 24 to allow the compressed gas to flow past. The flats 27 can also allow debris to flow past the shuttle guide 25.

Shuttle guide 25 includes corners 28. There are four corners 28. The corners 28 engage the inner surface of the passage 24 to stabilize and guide the shuttle guide 25 within the passage 24. The corners 28 could be squared off, but in this embodiment, the corners 28 include axial grooves 29. The axial grooves 29 of the part of the corners 28 that do not contact the inner surface of the passage 24. The axial grooves 29 are defined between engagement ridges 39. The engagement ridges 39 extend axially, parallel with the grooves 29. Eight engagement ridges 39 are shown. The engagement ridges 39 engage the inner cylindrical surface of the passage 24. The axial grooves 29 can accommodate larger debris to pass past the shuttle guide 25, which may otherwise cause shuttle 14 to wedge or otherwise not move reliably. The flats 27 and the axial grooves 28 minimize the contact surface area between the shuttle guide 25, to the engagement ridges 39, to decrease friction when the shuttle 14 moves axially within the passage 24. The engagement ridges 39 and/or the grooves 29 can extend from the shoulder 23 to the downstream edge of the shuttle guide 25.

Figure 10:
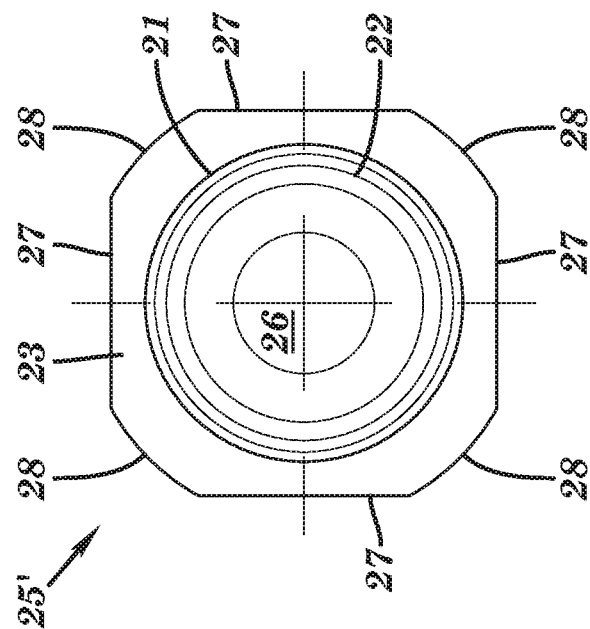
FIG. 10 is a front view of the alternative shuttle guide.
Figure 9:
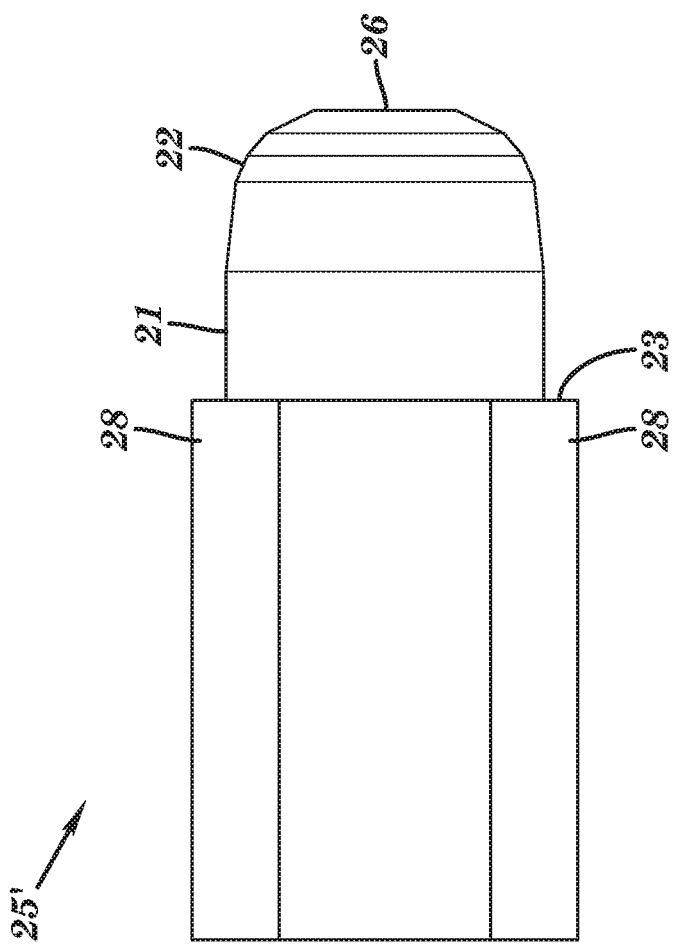
FIG. 9 is a side view of an alternative shuttle guide.

FIG. 9 is a side view of an alternative shuttle guide 25'. FIG. 10 is a front view of the alternative shuttle guide 25'. The shuttle guide 25' demonstrates corners 28, without grooves 29, between the flats 27. The flats 27 define the sides of the shuttle guide 25'. The corners 28 are rounded such that the rounded corners 28 to engage the inner cylindrical surface of the passage 24. As shown in FIG. 9, the radiused portion 22, between the cylindrical portion 21 and the flat tip 26 in this embodiment, is not be continuously radiused but rather has several concentric radiused sections of different pitches.

The present disclosure is made using an embodiment to highlight various inventive aspects. Modifications can be made to the embodiment presented herein without departing from the scope of the invention. As such, the scope of the invention is not limited to the embodiment disclosed herein.

The following is claimed:

1. A pneumatic landfill pump cycle counter comprising:
  a housing body having an inlet, an outlet, and a passage extending from the inlet to the outlet;
  a spring located within the passage;
  a shuttle comprising a shuttle magnet, the shuttle located within the passage, the shuttle configured to be:
    moved axially by the spring within the passage in an upstream direction to a home position,
    moved axially by one or both of air pressure differential and airflow within the passage in a downstream direction away from the home position to a hold position; and
  a counter comprising an element responsive to a magnetic field of the shuttle magnet, the counter configured to increment a numeric count for each complete cycle of the shuttle moving from the home position to the hold position and then back to the home position,
  wherein the shuttle comprises a plurality of axial external grooves extending parallel with an axis of travel of the shuttle.

2. The pneumatic landfill pump cycle counter of claim 1, wherein the counter comprises a counter magnet.

3. The pneumatic landfill pump cycle counter of claim 2, wherein the counter magnet is configured to be magnetically forced by the shuttle magnet to move from a primary position to a secondary position.

4. The pneumatic landfill pump cycle counter of claim 3, wherein the counter magnet rests in the primary position when the shuttle magnet is in the home position, and the counter magnet is forced to move from the primary position to the secondary position due to the shuttle magnet moving from the home position toward the hold position.

5. The pneumatic landfill pump cycle counter of claim 4, further comprising a brace configured to engage the shuttle to hold the shuttle in the hold position.

6. The pneumatic landfill pump cycle counter of claim 1, wherein the shuttle comprises a nose.

7. The pneumatic landfill pump cycle counter of claim 6, wherein the nose comprises a radiused section and a shoulder, the radiused section located in the upstream direction with respect to the shoulder.

8. The pneumatic landfill pump cycle counter of claim 7, wherein the nose comprises a cylindrical section located in the downstream direction with respect to the radiused section.

9. The pneumatic landfill pump cycle counter of claim 8, wherein the nose comprises a flat end located in the upstream direction with respect to the radiused section.

10. The pneumatic landfill pump cycle counter of claim 8, wherein no exterior part of the shuttle has a conical or frustroconical profile.

11. The pneumatic landfill pump cycle counter of claim 8, wherein the nose has a snubbed shape.

12. The pneumatic landfill pump cycle counter of claim 1, wherein the plurality of axial external grooves are located at respective corners of the shuttle.

13. The pneumatic landfill pump cycle counter of claim 12, wherein the respective corners are each located between flats of the shuttle.

14. A landfill pump system, comprising:
  the pneumatic landfill pump cycle counter of claim 1;
  a source of compressed gas;
  a submersible landfill pump powered by compressed gas supplied by the source of compressed gas, the submersible landfill pump configured to complete a series of cycles, each cycle comprising:
    a dwell phase in which the submersible landfill pump does not accept compressed gas while the submersible landfill pump fills with landfill liquid, a pump phase in which the submersible landfill pump accepts compressed gas to expel landfill liquid from the submersible landfill pump, wherein the pneumatic landfill pump cycle counter is configured to count the number of cycles of the submersible landfill pump based on flow of compressed air from the source of compressed gas to the submersible landfill pump.

15. A pneumatic landfill pump cycle counter comprising:
a housing body having an inlet, an outlet, and a passage extending from the inlet to the outlet;
a spring located within the passage;
a shuttle comprising a shuttle magnet, the shuttle located within the passage, the shuttle configured to be:
  moved axially by the spring within the passage in an upstream direction to a home position,
  moved axially by one or both of air pressure differential and airflow within the passage in a downstream direction away from the home position to a hold position;
a counter comprising an element responsive to a magnetic field of the shuttle magnet, the counter configured to increment a numeric count for each complete cycle of the shuttle moving from the home position to the hold position and then back to the home position; and
a brace configured to engage the shuttle to hold the shuttle in the hold position,
wherein the brace stops the shuttle from moving any further in the downstream direction away from the hold position when the shuttle is moved in the downstream direction by the one or both of the pressure differential and the airflow, but the brace permits the shuttle to be moved in the upstream direction away from the hold position when the force of the spring overcomes the force of the one or both of the pressure differential and the airflow,
wherein the counter comprises a counter magnet,
wherein the counter magnet is configured to be magnetically forced by the shuttle magnet to move from a primary position to a secondary position, and
wherein the counter magnet rests in the primary position when the shuttle magnet is in the home position, and the counter magnet is forced to move from the primary position to the secondary position due to the shuttle magnet moving from the home position toward the hold position.

16. The pneumatic landfill pump cycle counter of claim 15, wherein the brace maintains the shuttle in the hold position so that magnetic force from the shuttle magnet maintains the counter magnet in the secondary position so long as the shuttle remains in the hold position.

17. The pneumatic landfill pump cycle counter of claim 16, wherein the axial position of the brace along the passage is adjustable by threading.

18. A pneumatic landfill pump cycle counter comprising:
a housing body having an inlet, an outlet, and a passage extending from the inlet to the outlet;
a spring located within the passage;
a shuttle comprising a shuttle magnet, the shuttle located within the passage, the shuttle configured to be:
  moved axially by the spring within the passage in an upstream direction to a home position,
  moved axially by one or both of air pressure differential and airflow within the passage in a downstream direction away from the home position to a hold position; and
a counter comprising an element responsive to a magnetic field of the shuttle magnet, the counter configured to increment a numeric count for each complete cycle of the shuttle moving from the home position to the hold position and then back to the home position,
wherein the counter comprises a counter magnet,
wherein the counter magnet is configured to be magnetically forced by the shuttle magnet to move from a primary position to a secondary position, and
wherein the counter increments a first half cycle count when the counter magnet moves from the primary position to the secondary position, and the counter increments a second half cycle count when the counter magnet moves from the secondary position to the primary position.

19. The pneumatic landfill pump cycle counter of claim 18, wherein the first half cycle count and the second half cycle count results in the counter incrementing a single integer corresponding to one pump cycle.

* * * * *